United States Patent [19]
Wilde

[11] Patent Number: 5,929,869
[45] Date of Patent: Jul. 27, 1999

[54] TEXTURE MAP STORAGE WITH UV REMAPPING

[75] Inventor: Daniel P. Wilde, Cedar Park, Tex.

[73] Assignee: Cirrus Logic, Inc., Fremont, Calif.

[21] Appl. No.: 08/811,491

[22] Filed: Mar. 5, 1997

[51] Int. Cl.$^6$ .................................................. G06F 13/00
[52] U.S. Cl. .......................................... 345/508; 345/430
[58] Field of Search ................................. 345/425–431, 345/507–509, 523, 515, 526

[56] References Cited

U.S. PATENT DOCUMENTS

| | | | |
|---|---|---|---|
| 4,583,185 | 4/1986 | Heartz et al. | 364/521 |
| 4,586,038 | 4/1986 | Sims | 340/729 |
| 4,692,880 | 9/1987 | Merz et al. | 364/521 |
| 4,714,428 | 12/1987 | Bunker et al. | 434/43 |
| 4,715,005 | 12/1987 | Heartz | 364/521 |
| 4,727,365 | 2/1988 | Bunker et al. | 340/728 |
| 4,811,245 | 3/1989 | Bunker et al. | 364/521 |
| 4,821,212 | 4/1989 | Heartz | 364/521 |
| 4,825,391 | 4/1989 | Merz | 364/526 |
| 4,855,937 | 8/1989 | Heartz | 364/521 |
| 4,862,388 | 8/1989 | Bunker | 364/521 |
| 4,905,164 | 2/1990 | Chandler et al. | 364/518 |
| 4,958,305 | 9/1990 | Piazza | 364/522 |
| 4,965,745 | 10/1990 | Economy et al. | 364/518 |
| 5,029,109 | 7/1991 | Ikenoue et al. | 395/115 |
| 5,068,805 | 11/1991 | Tsuzuki | 345/523 |
| 5,126,726 | 6/1992 | Howard et al. | 340/728 |
| 5,187,754 | 2/1993 | Currin et al. | 382/54 |
| 5,191,642 | 3/1993 | Quick et al. | 395/127 |
| 5,268,996 | 12/1993 | Steiner et al. | 395/126 |
| 5,293,467 | 3/1994 | Buchner et al. | 395/122 |
| 5,357,579 | 10/1994 | Buchner et al. | 382/1 |
| 5,367,615 | 11/1994 | Economy et al. | 395/129 |
| 5,420,970 | 5/1995 | Steiner et al. | 395/133 |
| 5,548,740 | 8/1996 | Kiyohara | 345/508 |
| 5,717,440 | 2/1998 | Katsura et al. | 345/513 |

FOREIGN PATENT DOCUMENTS

WO 96/36011   11/1996   WIPO ............................ G06T 3/00

*Primary Examiner*—Kee M. Tung
*Attorney, Agent, or Firm*—Robert V. Wilder; Steven A. Shaw

[57] ABSTRACT

A process and implementing computer system for graphics applications in which polygon information is organized, stored and transferred in terms of "UV" addressable designated texel blocks of information within the graphics system. The texel information blocks are re-configured and remapped from normal graphics "UV" configuration to "XY" addressable configuration in order to allow storage of the texel blocks in otherwise unused sections of the relatively fast frame buffer memory.

6 Claims, 7 Drawing Sheets

| REMAP MODE | TEXEL ADDRESS "U" | "V" | BYTES PER TEXEL | NORMAL MEMORY SPACE REQUIRED | | REMAPPED MEMORY SPACE REQUIRED | | |
|---|---|---|---|---|---|---|---|---|
| | | | | X BYTES | Y LINES | X BYTES | Y LINES | |
| MODE 0 | 256 | 256 | 1 | 256 | 256 | 256 | 256 | NO REMAP |
| MODE 1 | 256 | 256 | 1 | 256 | 256 | 512 | 128 | REMAP Y(8-7) TO U(9-8) |
| MODE 1 | 256 | 512 | 1 | 256 | 512 | 1024 | 128 | |
| MODE 1 | 128 | 256 | 2 | 256 | 256 | 512 | 128 | |
| MODE 1 | 128 | 512 | 2 | 256 | 512 | 1024 | 128 | |
| MODE 1 | 64 | 256 | 4 | 256 | 256 | 512 | 128 | |
| MODE 1 | 64 | 512 | 4 | 256 | 512 | 1024 | 128 | |
| MODE 2 | 256 | 256 | 2 | 512 | 256 | 1024 | 128 | REMAP Y(8-7) TO U(9-10) |
| MODE 2 | 256 | 512 | 2 | 512 | 512 | 2048 | 128 | |
| MODE 2 | 128 | 256 | 4 | 512 | 256 | 1024 | 128 | |
| MODE 2 | 128 | 512 | 4 | 512 | 512 | 2048 | 128 | |
| MODE 2 | 512 | 256 | 1 | 512 | 256 | 1024 | 128 | |
| MODE 2 | 512 | 512 | 1 | 512 | 512 | 2048 | 128 | |
| MODE 3 | 256 | 256 | 4 | 1024 | 256 | 2048 | 128 | REMAP Y(7-8) TO U(11-10) |
| MODE 3 | 256 | 512 | 4 | 1024 | 512 | 4096 | 128 | |
| MODE 3 | 512 | 256 | 2 | 1024 | 256 | 2048 | 128 | |
| MODE 3 | 512 | 512 | 2 | 1024 | 512 | 4096 | 128 | |

*FIG. 4*

TEXTURE MAP STORAGE WITH UV REMAPPING

FIELD OF THE INVENTION

The present invention relates generally to computer graphics and more particularly to signal processing methods for multi-dimensional graphics systems with optimized memory mapping.

BACKGROUND OF THE INVENTION

The use and application of computer graphics to all kinds of systems environments continues to increase to an even greater extent with the availability of faster and faster information processing and retrieval devices. The speed of operation of such devices remains a high priority design objective. This is especially true in a graphics system and even to a greater extent with 3D graphics systems. Such graphics systems require a great deal of processing for huge amounts of data and the speed of data flow is critical in providing a new product or system or in designing graphics systems to apply to new uses.

In all data and information processing systems, and especially in computer graphics systems, much time is consumed in accessing data from a memory or storage location, then processing that information and sending the processed information to another location for subsequent access, processing and/or display. As the speed of new processors continues to increase, access time for accessing and retrieving data from memory is becoming more and more of a bottleneck in terms of system speed and overall performance.

Graphic systems must be capable of performing more sophisticated functions in less time in order to process greater amounts of graphical data required by modern software applications. There is a continuing need for improvements in software methods and hardware implementations to draw three-dimensional objects using texture maps which contain full color, shading, and transparency blending information. The development of raster display systems has dramatically reduced the overall cost and increased the capabilities of graphic systems. In a raster display system, a set of horizontal or orthogonal scan lines, each comprising a row of pixels, forms an array or grid of pixels to represent the entire screen area. The screen is preferably a cathode ray tube (CRT) or liquid crystal display (LCD) or the like capable of scanning the entire pixel grid at a relatively high rate to reduce flicker as much as possible.

The pixel data is preferably stored in a frame buffer comprising dynamic random access memories (DRAMs), where each pixel is represented by one or more bytes depending upon the desired resolution, color, brightness and other variables. Typical display systems can draw screens with multiple colors with a variety of screen resolutions, such as, but not limited to, 640×480, 800×600, 1024×768, 1280×480, 1280×1024, or other combinations depending upon the software drivers and the hardware used. A video controller scans and converts the pixel data in the frame buffer to control signals required by the screen system to display the information on the screen. The video controller scans each of the pixels sequentially, from top to bottom and from left to right on the display screen. In a color graphics system using a CRT, three separate beams are controlled i.e. one beam each for each of the primary colors, where the intensity of each of the beams is determined by the pixel value corresponding to the respective colors. A similar system is used for LCD devices. Each pixel value may comprise, for example, 24 bits, i.e. one 8-bit byte for each of the primary colors red, green and blue, where the byte value determines the intensity of the respective color to be displayed.

With specific reference to computer graphics applications, image texture information, such as color and transparency of displayed images, is stored in texture maps. A texture map is a two dimensional array of "texels" consisting of "U" texels in the horizontal direction, and "V" lines of texels in the vertical direction. As a polygon is rendered, texels are fetched from a "texture map", processed for lighting and blending, and then such texels become "pixels" of the polygon. As an image is produced on a display screen, each line of data stored in a frame buffer is sequentially accessed and transferred to the display device to fill-in corresponding sequential lines of pixels on the display. The frame buffer is updated by a draw engine portion of the graphics system, which is, in turn, updated by a texture engine portion of the graphics system. The texture engine accesses a texture map which is usually stored in system or host memory.

Texture maps in memory may also be stored in a local relatively fast and small "local" memory in a graphics device, or such maps may be stored in the relatively slow and large "systen" or "host" menory. When stored in the local memory, texture nap storage becomes a critical design concern and must be given special design consideration in order to naximize the efficiency and the efficient use of the relatively expensive fast local memory. This storage priority and design consideration is further complicated since texture map information is generally stored relative to a "U-V" reference and local memory is usually organized with an "X-Y" addressing scheme. With a local XY memory, after higher priority storage space has been taken, there may be ample storage area in "X" space for a given WI texture map, but not enough dimension in the "Y" direction to store a designated texture map block. Thus, it becomes necessary to develop a local memory storage remapping scheme in order to reduce the effective "V" space required of a texture storage block.

Accordingly, there is a need for an improved remapping method and implementation which is effective to remap a texture map block from a "UV" referenced designation to an "XY" addressing equivalent in order to maximize the efficiency and efficient use of a local relatively fast subsystem memory, in combination with a host or system memory, in storing texture maps blocks of texture related information.

SUMMARY OF THE INVENTION

A method and implementing system is provided for determining whether there is available and unused space in a local subsystem memory to store blocks of information which would otherwise be stored in a slower system host memory. A determination is made concerning the area of local storage space available. That area is compared with a total area of an information block to be stored such as a texture map block of information in an exemplary graphics system. If there is sufficient area in the local memory, the dimensions of the texture map block are compared to the available storage area. If the dimensions allow, the texture map block is stored in the local memory, and the "XY" address of the storage location in local memory is cross-referenced to the "UV" designation in the graphics system, and the process may be repeated for the next texture map block. If one of the dimensions of the available storage area in the local memory is less than a corresponding dimension of a texture map block, then the texture map block is remapped, for example by doubling the "U" dimension and halving the "V" dimension, until the remapped texture map block will fit into the available local memory space. The block may then be stored and the process repeated until all available local memory space has been efficiently utilized and there remains insufficient local memory space to contain additional blocks of texture map information.

BRIEF DESCRIPTION OF THE DRAWINGS

A better understanding of the present invention can be obtained when the following detailed description of a preferred embodiment is considered in conjunction with the following drawings, in which:

FIG. 4 is an exemplary texel address remapping schedule;

DETAILED DESCRIPTION

Figure 1:
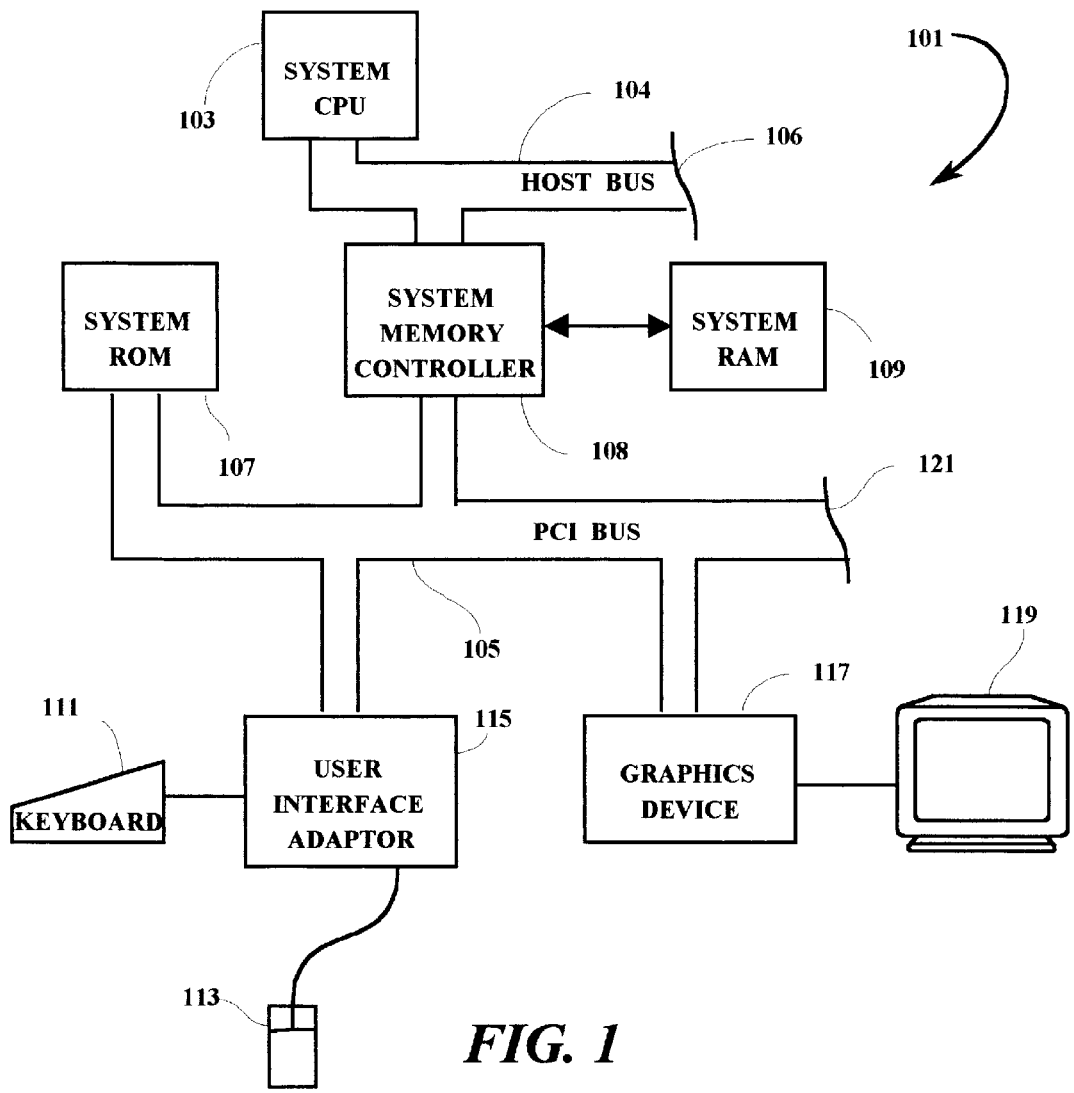
FIG. 1 is a simplified block diagram of a computer system including a graphics subsystem.

With reference to FIG. 1, the various methods discussed above may be implemented within a typical computer system or workstation 101. A typical hardware configuration of a workstation which may be used in conjunction with the present invention is illustrated and includes a system central processing unit (CPU) 103, such as a conventional microprocessor, and a number of other units interconnected through a system or host bus 104. A system memory controller 108 is connected between the host bus 104 and a PCI bus 105. The system memory controller 108 is connected to a system RAM 109. The PCI bus 105 is connected to system ROM 107 and also to a user interface adaptor 115. The user interface adaptor 115 is arranged for connection to various user input devices such as a keyboard 111 and a mouse device 113. Other user interface devices such as a touch screen device (not shown) may also be coupled to the PCI bus 105 through the user interface adapter 115. A graphics device 117 is connected to the PCI bus 105 and also to a display device 119. The PCI bus 105 may include an extension 121 for further connections to other workstations or networks, and the like. Since the workstation or computer system 101 within which the present invention is implemented is, for the most part, generally known in the art and composed of electronic components and circuits which are also generally known to those skilled in the art, circuit details beyond those shown in FIG. 1, will not be explained to any greater extent than that considered necessary as illustrated above, for the understanding and appreciation of the underlying concepts of the present invention and in order not to obfuscate or distract from the teachings of the present invention.

Figure 2:
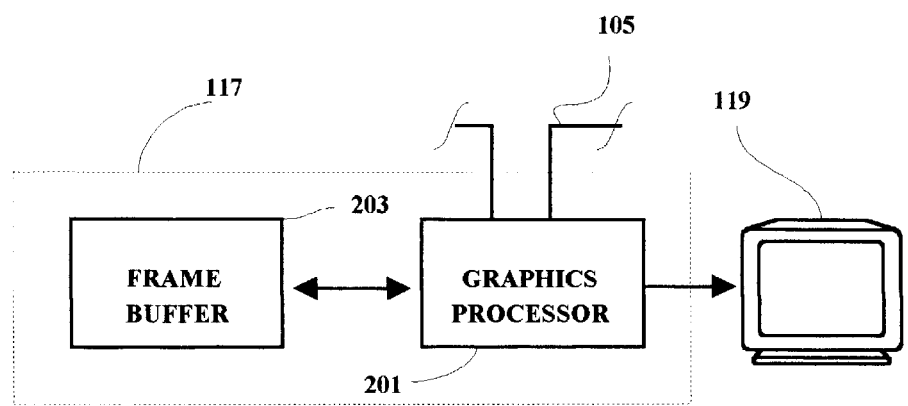
FIG. 2 is a simplified block diagram of the graphics device shown in FIG. 1.

In FIG. 2, the PCI bus 105 is shown connected to the graphics device or subsystem 117. The graphics device 117 may include, for example, a graphics processor 201 which is arranged to process, transmit and receive information or data from a frame buffer unit 203 as well as to and from the system or host memory 109. The frame buffer unit 203 contains frame display information which is accessed by the graphics processor 201 which, in turn, is connected to a display device 119. The display device 119 is operable to provide a graphics display of the information stored in the frame buffer 203 as processed by the operation of the graphics processor 201. Although the present example shows a graphics processor 201 separate from a system CPU 103, it is understood that the present invention is not limited to having a separate graphics processor but rather also includes systems in which the methodology taught herein is implemented within or as part of a single system CPU or other larger system chip or integrated circuit.

Figure 3:
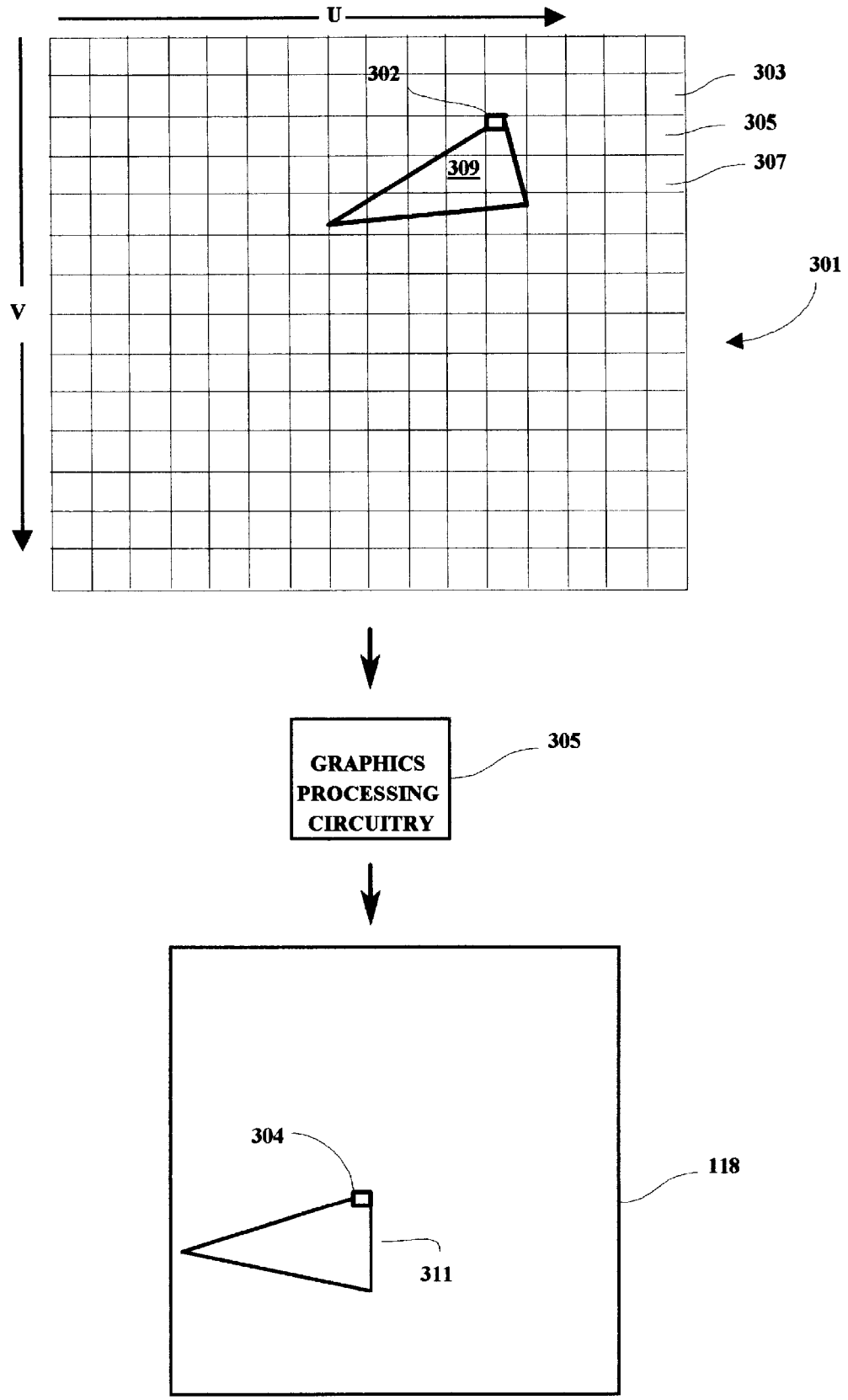
FIG. 3 is an illustration showing an exemplary texture map used in the graphics subsystem in connection with the generating a corresponding graphics polygon.

In FIG. 3, there is shown a texture map (TM) 301 which includes a matrix of tiles including tiles 303, 305 and 307. Each tile is, in turn, comprised of a matrix of texels, which comprise image texture information stored in a format to correspond to related pixels of a display screen. The texture map (TM) 301 defines an area of memory which contains digital texture information concerning a particular polygon such as polygon 309. As hereinbefore noted, texture information includes information describing the various attributes of a polygon such as depth (for 3D graphics applications), transparency, and color. In graphics systems, there is also a separate polygon algorithm stored in memory for reproducing the shapes of various polygons. The texture memory space is referred to as "UV space" since the space is defined in terms of "U" and "V" coordinates, which differ from the "XY" coordinates normally used with rastered video displays. In a texture map or "TM", "texels" such as texel 302, define the smallest addressable point in a texture map. For example, in FIG. 3, texel 302 in texture map 301 corresponds in position to pixel 304 on a display screen 118. Texture information in texture or "UV" space concerning a polygon 309 is processed with polygon information in "X-Y space" by graphics circuitry 305 to effect the display of a 3-D color polygon 311 on the display screen 118. The number of bytes per texel or pixel varies and depends upon the particular application and the screen resolution.

A pixel grid in memory is a representation of two dimensional space in a linear accessed memory. Linear accessed memory has incrementing addresses for each location in memory i.e. a one dimensional space. A two dimensional space can be represented in one dimensional addressing by creating a pitch value to the "Y" parameter, i.e. for each increment in "Y", a number of pixel grid locations exist in "X". This allows a linear address to be calculated from a two dimensional XY pixel grid access. Most methods for drawing to a pixel grid use the above method to access a pixel grid. The XY mapping is fixed at the time the polygons are being drawn based on the current two dimensional pixel grid in memory. From that point on, the pixel grid, unless noted otherwise, will be assumed to be a fixed two dimensional representation of a pixel grid in linear addressed memory.

in a graphics subsystem, an address generator circuit, which is part of a graphics subsystem, operates to generate a texture map or TM address as may be requested by a graphics engine to process and/or display a particular pixel of a display screen. The TM address generated is in a so called "UV" format reserved for addressing TM information. As hereinbefore noted, texel map or TM information is formatted in block form, rather than linear form, so that blocks of information describing points surrounding any particular pixel can be packaged as a single unit for storage, access, retrieval and transfer. This method of packaging allows a graphics engine to draw a neighboring pixel which may be displaced in any direction from a current pixel, with increased likelihood that the neighboring pixel information is stored in a local cache or other local fast memory rather than requiring an access operation from the relatively and latently slower main host memory.

In accordance with the present disclosure, texture map information is reconfigured from its normal "block" configuration as necessary in order to store as many texture maps as possible into available and unused sections of the local and relatively fast RDRAM frame buffer memory of the graphics subsystem rather than storing all of the texture map sections in the host or system memory. That local frame buffer storage will allow access and delivery of more texture maps to the graphics engine from local frame buffer memory rather than main host memory, and thereby increase the speed of the system significantly since fewer host memory accesses and arbitrations will be required during the operation of the graphics subsystem.

The storage of texture maps into frame buffer memory requires that the texture maps be re-configured in order to enable and optimize the maximum number of TM segments to be stored. This is so since the design of frame buffer memories is driven by the display screen resolution and raster scanning process. Normally, for example, if there are 640 pixels per video or display scan line, the width of the frame buffer memory will be 640 bytes wide or a multiple thereof, such as 1280 bytes wide. The number of lines of 1280 byte wide memory sections will normally be determined by the required content of the frame buffer and the number of horizontal scans required to traverse the vertical dimension of a display screen. For example, typically there are two color buffer sections and, for 3-D graphics, there would be an additional "Z" or depth buffer section. Each of these sections would contain a number of lines corresponding to the number of raster scan lines on a display CRT for example. If there are 480 scan lines for example, each of the above three sections would require 480 lines. After the width is determined and the total number of lines of memory has been determined, the size of the frame buffer memory is defined to be the next higher standard or convenient size. This practice, unfortunately, designs-in unused memory space in the frame buffer which heretofore has been wasted. In accordance with the present invention, texel memory sections are reconfigured to fit into the otherwise unused and unusable sections of the frame buffer memory to provide relatively fast memory access to a greater number of texture maps in a graphics subsystem.

In FIG. 4, an exemplary texel address remapping schedule is shown for various possible remapping requirements. In accordance with the schedule, there are shown four possible "modes" for remapping. The mode at any given time depends upon how much "U width" ("Normal Memory Space Required") is available. In the present example, there are four modes designated as Mode "0" for a 128 byte wide block, Mode "1" for a 256 byte wide block, Mode "2" for a 512 byte wide block and Mode "3" for a 1024 byte wide block. The space required to store TM blocks will also be a function of the number of bytes per texel in the particular application. Since the number of available lines for storage is limited (128 lines in the FIG. 4 schedule), the remapped width of the TM block which may be stored in frame buffer memory will depend upon the number of bytes per texel and the UV area of the TM block to be stored. In accordance with the present disclosure, if adequate space is available in the frame buffer memory, the TM block is reconfigured into "X Bytes" and "Y Lines" of remapped memory space in order to fit into the usually smaller number of lines of buffer memory ("Y Lines") which are otherwise unused and available.

Figure 5:
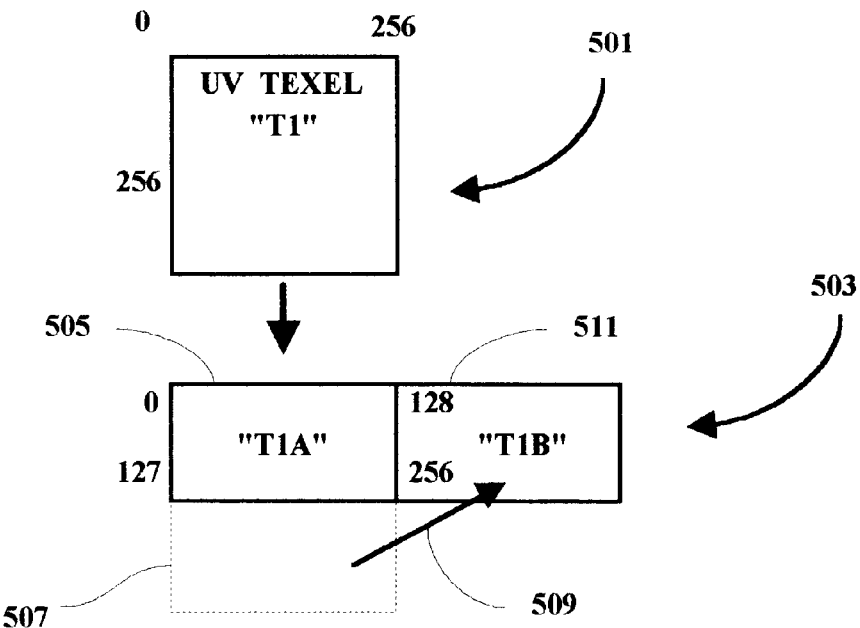
FIG. 5 is an illustration of the re-configuration process implemented in preparing texels for storage in unused space of a frame buffer memory.
Figure 6:
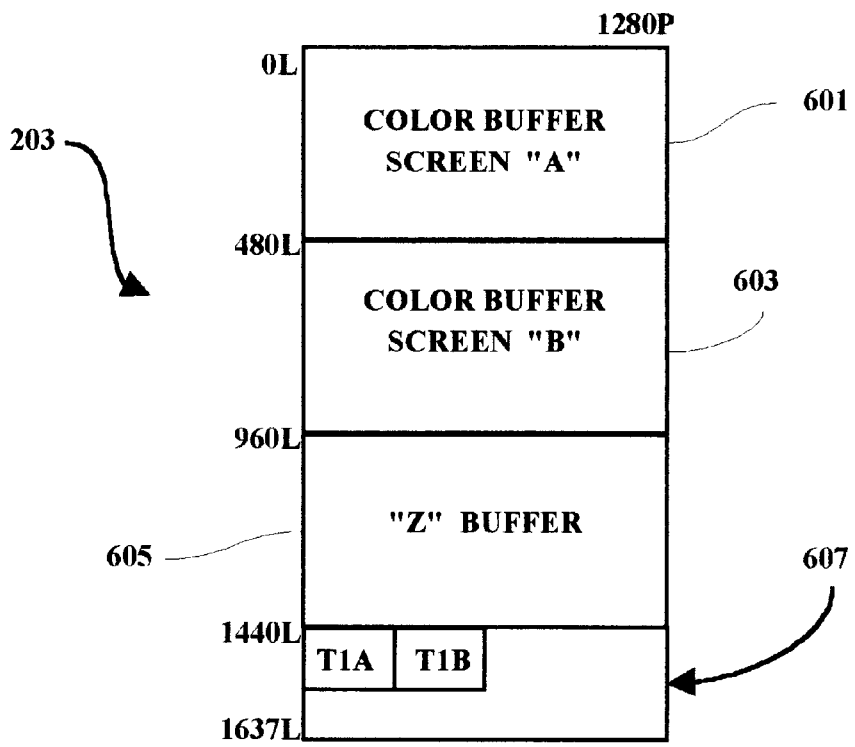
FIG. 6 is an illustration of the content of the frame buffer memory including re-configured and remapped texels of a texture map.

To illustrate the texel re-configuring technique implemented in the present example, reference is now made to FIG. 5 and FIG. 6. FIG. 5 shows an exemplary texel block 501 which is designated "T1". As shown, T1 is configured in a 256×256 texel matrix or block of information having 256 texels per line and 256 lines. As shown in FIG. 6, a frame buffer memory 203 in the present 3-D graphics example includes three sections: a color buffer screen "A" section 601; a color buffer screen "B" section 603; and a "Z" or depth buffer section 605. Each of those sections includes 480 lines, for a total of 1440 used lines, and each line includes 1280 bytes of information for a total used buffer memory area of 1,843,200 bytes. Since a 2 Megabyte (2,096,640 bytes) memory will have 1638 lines at 1280 bytes per line, there will be an unused or available memory area 607 comprising 197 lines which would normally be wasted and not be used in the frame buffer memory 203. This is a significant area (197 lines×1280 bytes per line for a total space of 252 Kbytes) of relatively fast memory which can be utilized and accessed through an implementation of the present invention.

In order to utilize the buffer memory space 607, which comprises only 197 lines of memory in the present example, for storing texels which are configured as blocks of information in a 256 line by 256 byte format, a re-configuration or translation of the texels is implemented as shown in FIG. 5. When texel T1, is divided into two sections or 505 and 507, and the second section is moved 509 to a location 511 adjacent to the first section 505, the new texel configuration comprising T1A and T1B now contains only 128 lines but now the original block of information is 512 bytes wide, and can be easily stored in the 197 lines available in the buffer memory as shown in FIG. 6. In other words, the re-configurinq method in the present example is to reduce by one-half the number or lines in the original TM and move the lower "V" lines or lower one-half of the original TM to a position in the RDRAM memory which is adjacent to the first one-half section. Thus, in the TM, the "V" lines will be halved and the "U" columns will be doubled. Accordingly, a 256×256 byte block of information will become a 128×512 block. That process may be repeated such as to create an even narrower strip of memory positions in the form of a 64×1024 block in order to fit into the available line space of the RDRAM. Thus, the remaining 69 lines in the present example can be utilized by a reconfiguring of the texels into a new 64×1024 TM block. By practicing the disclosed method of optimal memory utilization and re-making, the graphics subsystem processing speed is substantially increased since there are fewer host memory accesses and associated access delays incurred during normal system operation.

Figure 7:
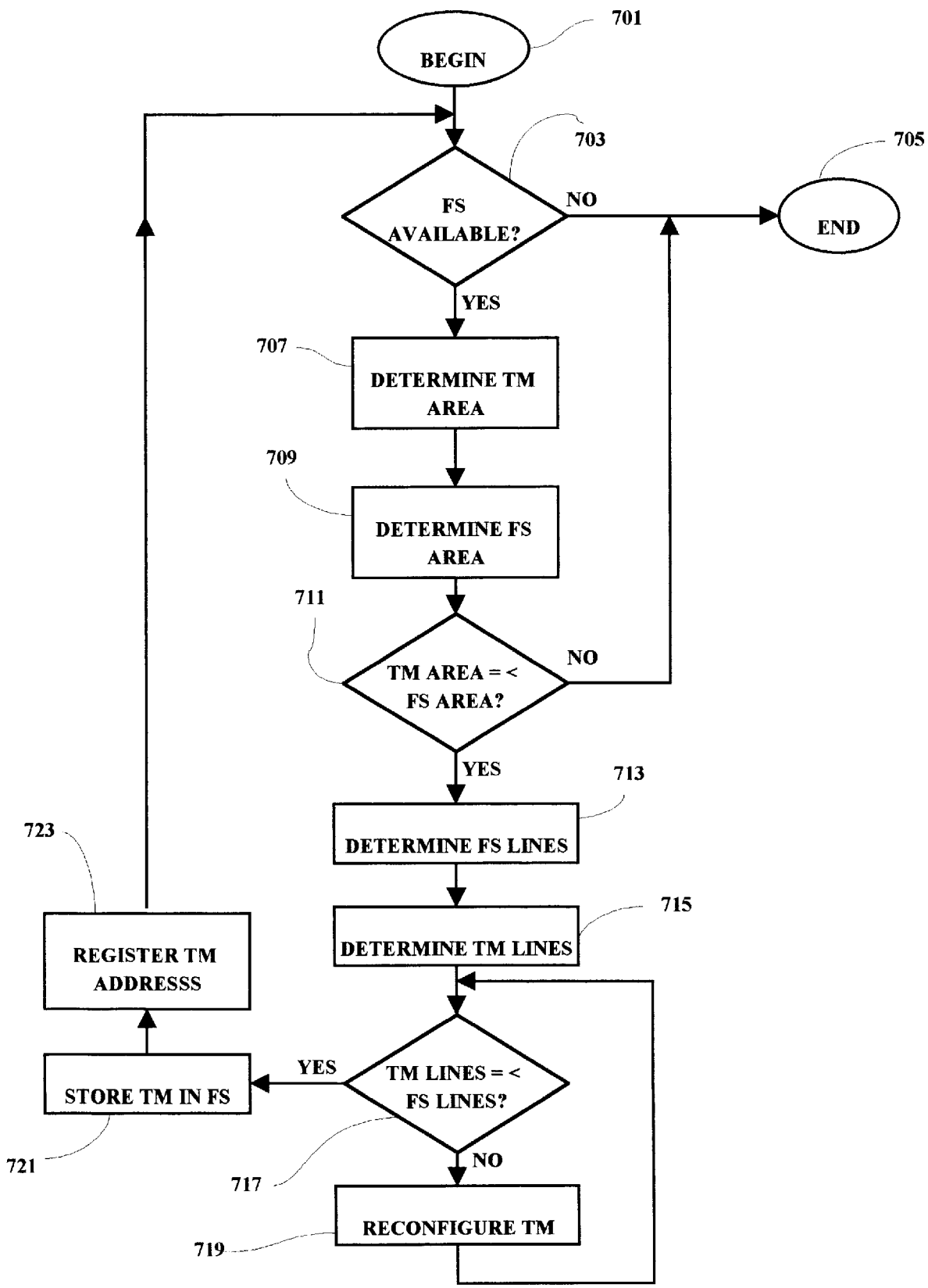
FIG. 7 is a flow chart showing the method of operation of the disclosed example.

In FIG. 7, a flow of the sequence of operational steps accomplished in the present example begins 701 by determining 703 if there is any free or unused memory space (FS) available in the RDRAM or frame buffer memory 203. If free space is not available, the sequence ends 705. if, however, it is determined that free space is available, the next step is to determine 707 the memory area of a texture map TM which is sought to be stored in the RDRAM. In most cases there are a plurality of TMs, any one of which could be stored in the RDRAM, Likewise there are many priorities for storing particular ones of TMs before storing others.

For purposes of the present example, it is assumed that a priority schedule has been implemented and it is known that a particular TM is next for storage in RDRAM if space is found to be available. After determining the TM area of the TM to be stored, the area of the available free space is determined 709 and an area fit comparison is made 711 to insure that the available FS area is large enough to store the TM area (without regard to area dimensions at this point). If the FS area is not large enough to store the TM area, then the process is ended 705. If, however, the FS area is large enough to store the TM, then the number of lines in the free space is determined 713 along with the number of line in the TM 715, and a test is made 717 to detect whether the number of TM lines is equal to or less than the number of free space available lines. if the determination is returned negative, the texture map is reconfigured 719, as shown in FIG. 5, and the new number of lines of the reconfiguired TM (½ of the original lines in the present example) is checked to determine if the reconfigured TM with ½ of the original lines will now fir into the available free space. This process continues until the number of lines in the TM to be stored is less than the number of lines of memory available in the available free space of the RDRAM, and then the reconfigured TM is stored in the RDPAM free space 721, the address of the reconfigured TM is registered 723, for example in the RDRAM memory controller, and the method is returned to again search for available free space 703 in the RDRAM memory.

Figure 8:
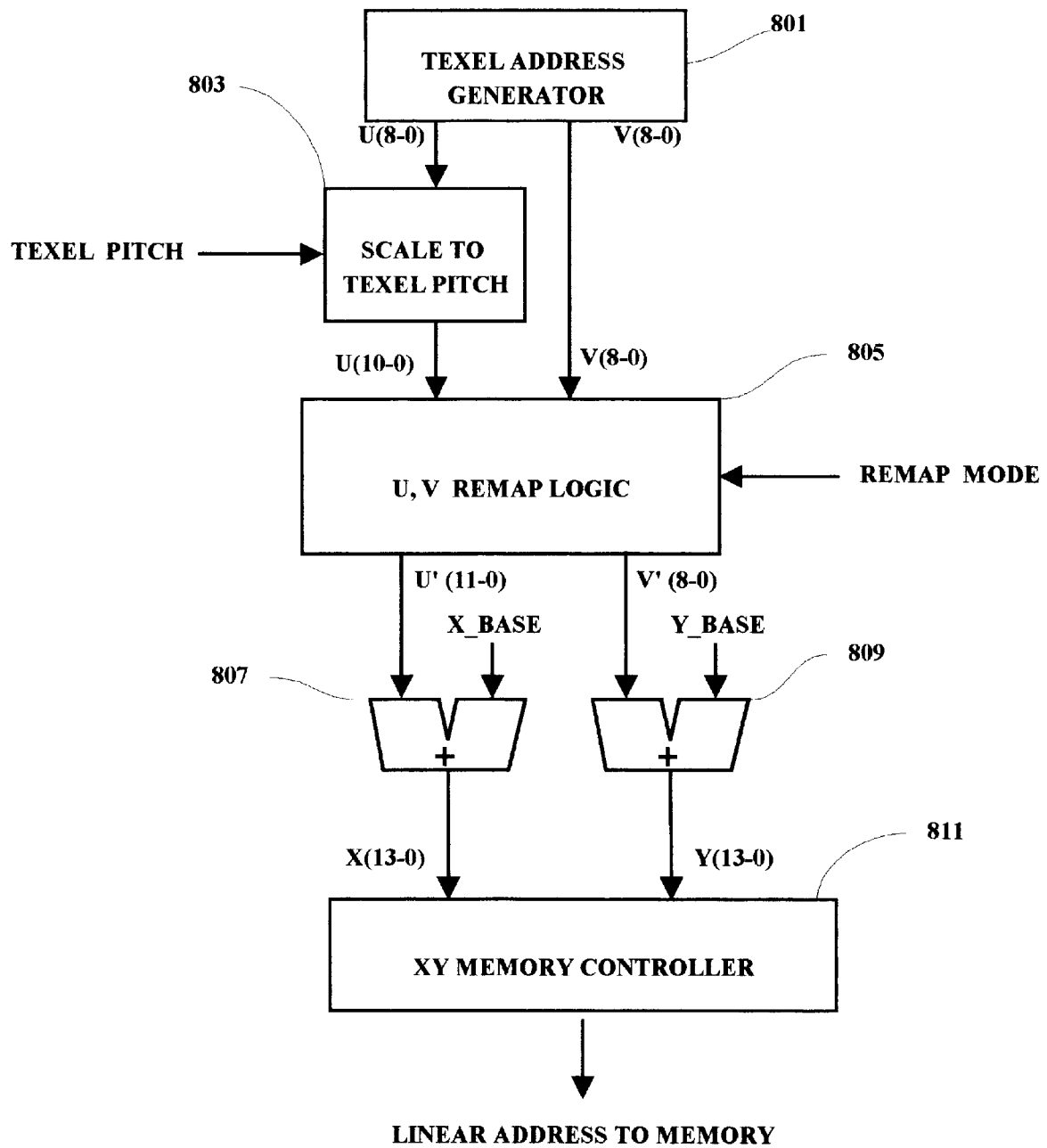
FIG. 8 is a schematic block diagram of an exemplary UV remapping circuit.

FIG. 8, there is shown a schematic block diagram of an exemplary UV remapping circuit. When, for example, a graphics application needs to store texel information, that information is assigned a UV address U(8-0), V(8-0), which is applied at the output of a texel address generator 801.

The address is then modified by a "Scale to Texel Pitch" circuit 803 which accounts for the number of bytes per texel and provides an 11 bit U address U(10-0). The UV address U(10-0) V(8-0) is then applied to a UV remap logic circuit 805 which also receives an input representative of the particular remap mode needed. The UV Remap Logic provides a Remap Output address components U'(11-0), V'(8-0), which are added to the X_BASE and Y_BASE addresses, respectively, by adders 807 and 809, to provide a remapped XY address X(13-0), Y(13-0). The remapped XY address X(13-0) Y(13-0) is then applied to an XY Memory Controller 811 which provides a linear address to memory.

Figure 9:
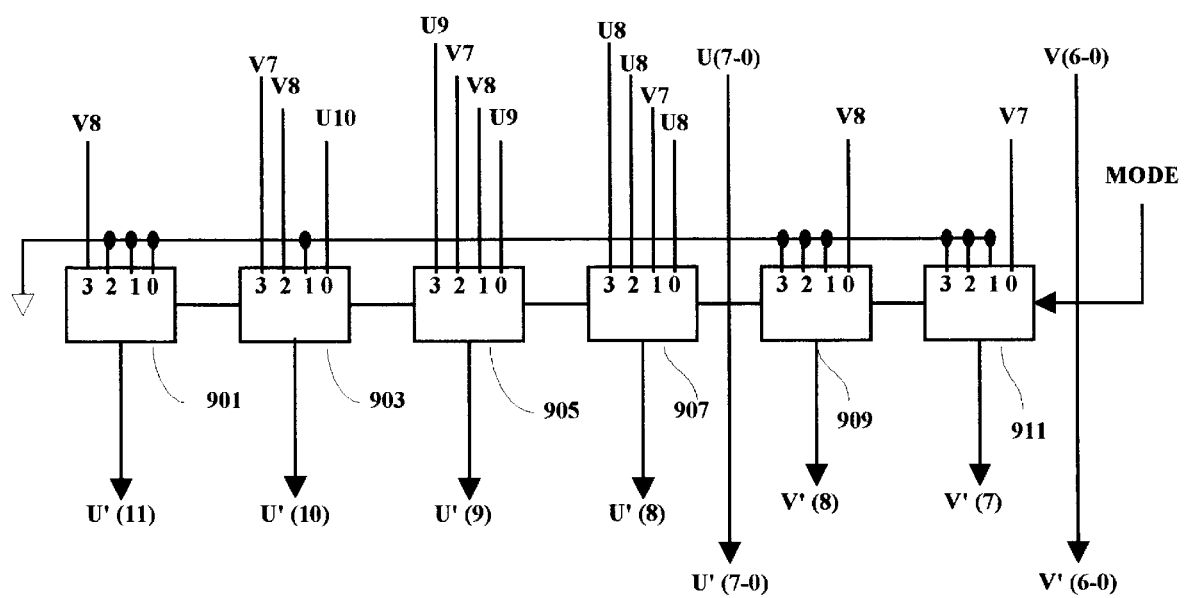
FIG. 9 is a schematic diagram of the remap logic device shown in FIG. 8.

FIG. 9 shows the details of the UV Remap Logic Circuit 805. The Remap circuit 805 includes a series of 6 MUX circuits 901, 903, 905, 907, 909 and 911, which are all controlled by a MUX Select line connected to a signal representative of the selected MODE, as determined in accordance with the FIG. 4 schedule. The MODE will thereby determine which of the four inputs is provided at the Remap Logic output which constitutes the Remapped Address U'(11-0), V'(8-0) from the texel address U(10-0), V(8-0). In FIG. 9, the "0", "1" and "2" terminals of the first MUX 901 are connected together to a common logic "0" bus or ground. Also connected to the common bus are the "1" terminal of MUX 903, the "3", "2" and "1" terminals of MUX 909 and MUX 911. Input line V(8) is connected to the "3" input of MUX 901, the "2" input of the MUX 903, the "1" input of the MUX 905 and the "0" input of the MUX 909. The V7 input is connected to the "3" input of the MUX 903, the "2" input of the MUX 905, the "1" input of MUX 907, and the "0" input of MUX 911. The UIO input is connected to the "0" input terminal of the MUX 903. The U9 input is connected to the "3" input terminal and the "0" input terminals of MUX 905. The U8 input line is connected to "3", "2" and "0": input terminals of MUX 907. Input lines U(7-0) are brought straight throuqh the Remap circuit 805 to provide the Remap output partial address portion U'(7-0), and input lines V(6-0) are also brought straight through the Remap circuit 805 to provide the Remap output partial address portion V'(6-0). The modified portions U(11-8), V(8-7) of the full Remap address U'(11-0), V'(8-0) are provided by the MUX circuits in accordance with the operating MODE as detailed in the schedule of FIG. 4.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. For use with a system which includes a relatively slow first memory, and a relatively faster second memory, a method for attempting to store blocks of information, defined by a "UV" configuration of "V" lines, and each of said "V" lines includes "U" bytes of memory in unused areas of said second memory, said method comprising:

determining if there is any unused memory area available in the second memory;

determining a measure of block memory area required by said block of information;

calculating a number of lines of information contained in the block of information to be stored if said unused memory area in the second memory is large enough to store said block memory area;

calculating a number of lines available in said memory area available in the second memory;

storing said block of information in said unused memory area of the second memory if said number of lines of information in said block of information is equal to or less than said number of lines available in said unused memory area of the second memory; and reconfiguring said block of information, if said number of lines of information in said block of information is greater than said number of lines available in said unused memory area of the second memory by reconfiguring the "UV" configuration into a reconfigured block of information "2U" bytes wide and "0.5V" lines long.

2. The method as set forth in claim 1 and further including:

repeating said step of reconfiguring until said number of lines of information in said reconfigured block of information is equal to or less than said number of lines available in said unused memory area of the second memory.

3. A computer based graphics station, including an information processing system comprising a host system bus connecting to a first memory, a system CPU, a display device, and a graphics subsystem, said graphics subsystem comprising a graphics processor device connected to said host system bus and to said display device, said graphics subsystem further including a second memory coupled to said graphics processor, said graphics subsystem being selectively operable to attempt to store blocks of information defined by a "UV" configuration of "V" lines, and each of said "V" lines includes "U" bytes of memory, into unused areas of said second memory before attempting to store the blocks of information in the first memory by accomplishing the steps of:

determining if there is any unused memory area available in the second memory;

determining a measure of block memory area required by said block of information;

calculating a number of lines of information contained in the block of information to be stored if said unused memory area in the second memory is large enough to store said block memory area;

calculating a number of lines available in said memory area available in the second memory;

storing said block of information in said unused memory area of the second memory if said number of lines of information in said block of information is equal to or less than said number of lines available in said unused memory area of the second memory; and reconfiguring said block of information if said number of lines of information in said block of information is greater than said number of lines available in said unused memory area of the second memory by reconfiguring the "UV" configuration into a reconfigured block of information "2U" bytes wide and "0.5V" lines long.

4. The graphics station as set forth in claim 3 and further including:

repeating said step of reconfiguring until said number of lines of information in said reconfigured block of information is equal to or less than said number of lines available in said unused memory area of the second memory.

5. A storage medium including machine readable indicia, said storage medium being selectively coupled to a reading device, said reading device being coupled to a processing system, said processing system including a first relatively slow access memory and a second relatively faster memory, said reading device being selectively operable to read said machine readable indicia and provide program signals representative thereof, said program signals being effective to cause said processing system to attempt to store blocks of information defined by a "UV" configuration of "V" lines, and each of said "V" lines includes "U" bytes of memory into the second memory before attempting to store the blocks of information into the first memory by accomplishing the steps of:

determining if there is any unused memory area available in the second memory;

determining a measure of block memory area reguired by said block of information;

calculating a number of lines of information contained in the block of information to be stored if said unused memory area in the second memory is large enough to store said block memory area;

calculating a number of lines available in said memory area available in the second memory;

storing said block of information in said unused memory area of the second memory if said number of lines of information in said block of information is equal to or less than said number of lines available in said unused memory area of the second memory; and reconfiguring said block of information if said number of lines of information in said block of information is greater than said number of lines available in said unused memory area of the second memory by reconfiguring the "UV" configuration into a reconfigured block of information "2U" bytes wide and "0.5V" lines long.

6. The medium as set forth in claim 5 and further including:

repeating said step of reconfiguring until said number of lines of information in said reconfigured block of information is equal to or less than said number of lines available in said unused memory area of the second memory.

\* \* \* \* \*